March 12, 1940.　　　H. S. HOFFAR　　　2,192,909
DIAMOND DRILL
Original Filed Oct. 4, 1937　　2 Sheets-Sheet 1
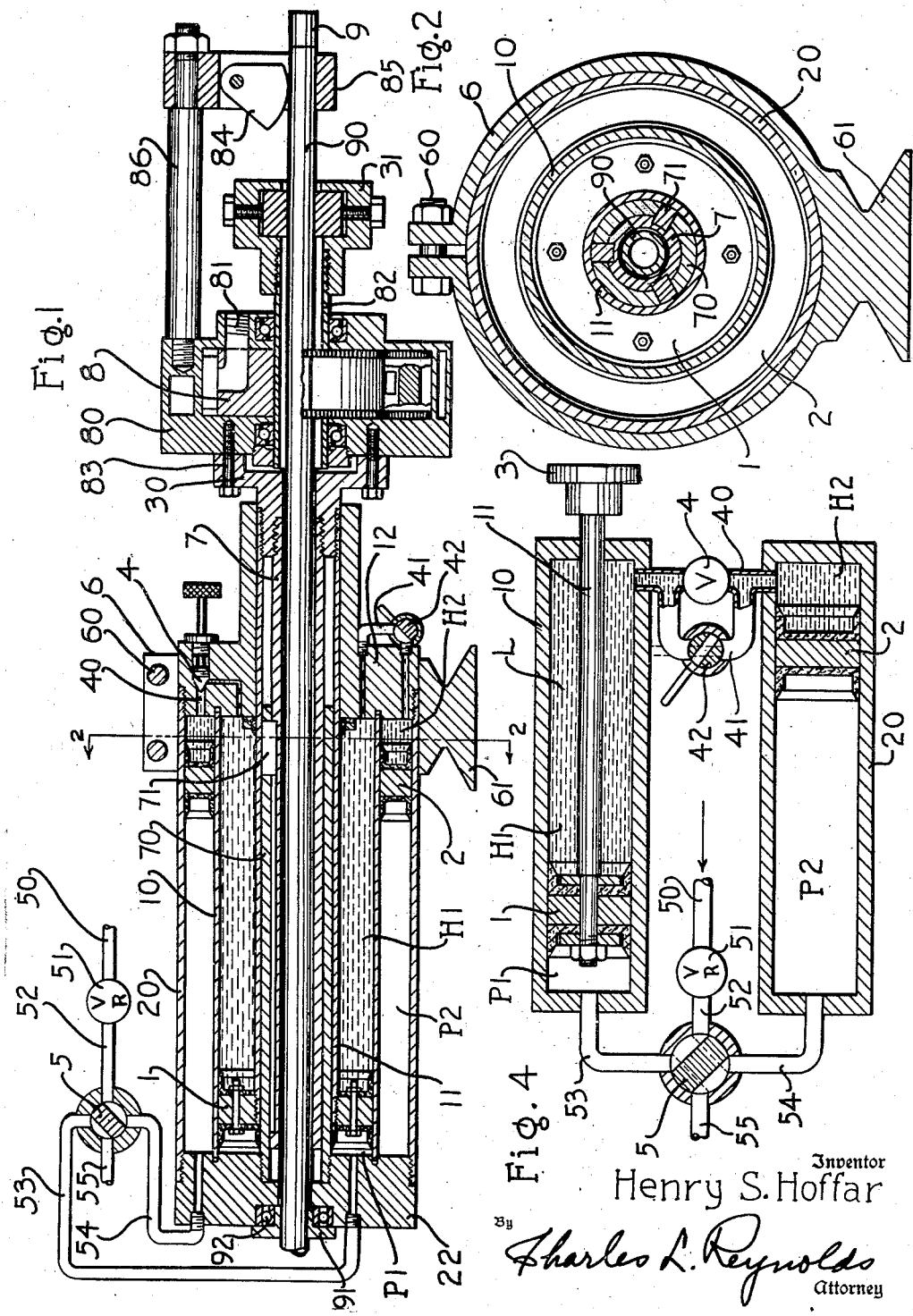
Inventor
Henry S. Hoffar
By Charles L. Reynolds
Attorney March 12, 1940.  H. S. HOFFAR  2,192,909
DIAMOND DRILL
Original Filed Oct. 4, 1937   2 Sheets-Sheet 2
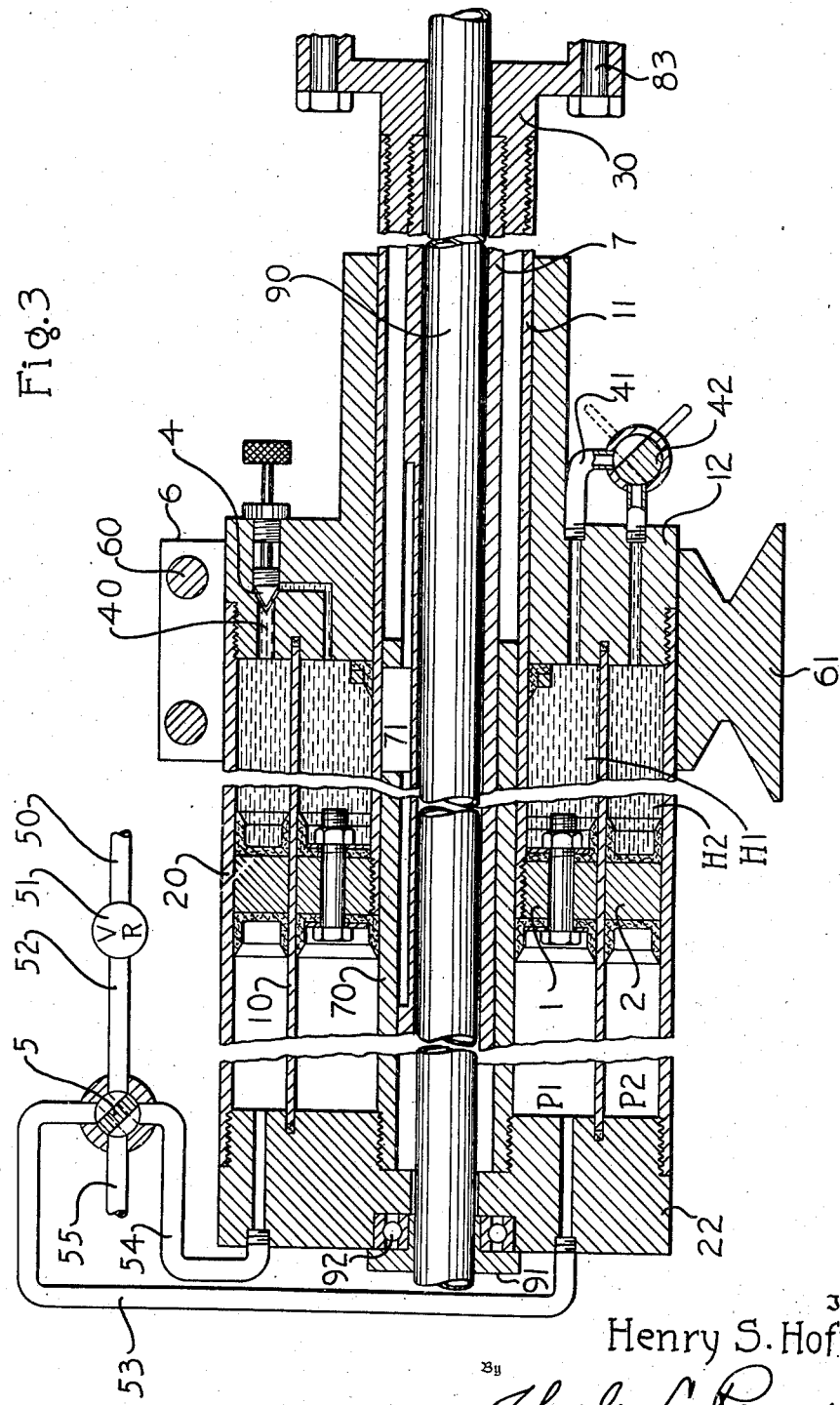
Inventor
Henry S. Hoffar
By
Charles L. Reynolds
Attorney Patented Mar. 12, 1940

2,192,909

UNITED STATES PATENT OFFICE 2,192,909

DIAMOND DRILL

Henry S. Hoffar, Vancouver, British Columbia, Canada

Application October 4, 1937, Serial No. 167,238
Renewed June 12, 1939

19 Claims. (Cl. 255—22)

My invention relates to a diamond drill, although in certain aspects the principles of this invention are applicable more generally to the feeding of tools—for instance, a drill press.

A diamond drill will encounter many different types of rock; for instance, the rock will vary in degree of hardness, and the ordinary diamond drill is therefore supplied with change speed gearing, whereby its rate of feed may be made faster or slower, but because of limitations mechanically, and as to space, expense and weight, it is not customary to provide diamond drills with more than three different speeds. In consequence that speed must be selected which is most nearly suited to the hardness of the rock being encountered, or other prevailing conditions, but which may not be best suited to the conditions obtaining.

It is one of the objects of this invention to provide a diamond drill in which the rate of feed may be made infinitely variable, within the capacity of the feed mechanism, from the maximum rate permitted to zero, through an infinite number of minute increments; furthermore, it is an object so to arrange the speed-changing mechanism that the entire range of adjustment may be accomplished without interrupting the drilling.

The ordinary diamond drill is fed forward by a screw mechanism disposed alongside the drill rod. This produces a thrust which is offset somewhat from the axis of the drill rod, and which therefore produces undesirable stresses. It is a further object of my invention to accomplish the feed by the application of equal force disposed entirely around the drill rod, producing a resultant force which is directed along the axis of the drill rod.

It is true that diamond drills have been fed by hydraulic means, but these are not common, and highly skilled operators must be employed. It is a further object of this invention to produce the feed primarily by pneumatic means, as distinguished from hydraulic means, whereby the feed means are yieldable (as is not the case with hydraulic feed means) upon encountering some unexpected resistance, as an increase in the hardness of the rock. This is further advantageous in that compressed air is almost always available where such drilling operations take place, and furnishes a convenient source of power, usable anywhere, whereas other power sources may constitute a source of danger, in some operations. Such a drill is, moreover, self-lubricating.

Such pneumatic means alone would be subject to the drawback that upon the drill bit breaking through a fissure, in fissured or seamed rock, the pneumatic feed means, suddenly expanding, would advance the drill bit in a manner to strike against the opposite face of the fissure, with the probable result of fracturing the diamond points, which are easily shattered by a blow. Accordingly, it is a further object to provide control or governing means for use in conjunction with pneumatic feed means, whereby the maximum rate of advance is rigidly controlled, and such a sudden advance is not permitted. It is furthermore an object to effect such governing action by hydraulic means, and by the control of the hydraulic means to govern, through infinitesimal increments, the maximum rate of feed, to any value desired within the capacity of the pneumatic feed mechanism.

Diamond drills are ordinarily rotated by motor mechanism of various kinds, disposed at right angles to the axis of the drill rod, and communicating to the latter by gear means, including a bevel gear placed coaxially about the drill rod. It is an object of this invention to provide drive means for rotating the drill rod which may be mounted upon the feed mechanism, rather than upon a separate support, and which may be disposed coaxially of the drill rod, so as to communicate torque thereto in the most direct and most effective manner.

It is customary to employ as a separate unit mechanism for pulling or retracting the drill rod, and it is usually necessary, when it is desired to withdraw the drill rod, to disconnect the drive mechanism and feed mechanism in order to permit the connection of the pulling mechanism, which must at that time be placed in operative position and connected to the drill rod. It is a further object of my invention to incorporate in the feed mechanism a suitable pulling mechanism, which is always available and which requires no change in the connections in order to make it effective, so that it is always and instantly available when needed, without any disturbance of the feed or driving mechanism.

Lightness in weight, compactness, ruggedness, and adaptability to varying conditions and to varying positions are desirable in all diamond drills, and it is a further object of my invention to achieve these objectives to a greater degree than in previous diamond drills.

Simplicity of setting up and of operation is also desirable in all diamond drills, and it is an additional object of my invention to simplify to the utmost the setting up and the control of the diamond drill, and to make the same in such a manner that it may be operated by any workman possessing reasonable care and judgment, though not highly skilled in the operation of diamond drills generally.

A still further object is to lessen the cost of the diamond drill as a whole, and in particular of the feed mechanism, the pulling mechanism, and the rotating mechanism.

Various other objects will appear as this specification progresses, those enumerated being selected as the outstanding objects of this invention.

My invention comprises the novel diamond drill as a whole, and in particular the novel feed mechanism therefor, the novel retracting mechanism therefor, and the novel construction of individual parts and their combination and relative arrangement. My invention consists also in the novel method of feeding, hereinafter disclosed and claimed. All such objects, and the particulars wherein the novelty of the invention resides, will become apparent from inspection of the accompanying drawings, and from study of the present specification and the claims at the end thereof.

In the accompanying drawings I have shown my invention both diagrammatically and incorporated in a form which at present is preferred by me, it being understood, however, that the disclosures herein made are illustrative rather than restrictive, and that the principles of my invention may be incorporated in various and widely variant forms and machines, without departing from the scope of my invention as hereinafter set forth.

Figure 1 is an axial section through the drill as a whole, showing parts in the position for retracting the drill rod.

Figure 2 is a transverse section substantially on the line 2—2 of Figure 1.

Figure 3 is an enlarged axial section similar to Figure 1, but showing the feed mechanism only, with parts in the position to advance the drill rod.

Figure 4 is a diagram, illustrating the principle of operation of my invention.

The principles of my invention will be best understood by reference to the diagrammatic showing of Figure 4. In this view are shown two cylinders, 10 and 20, and within these cylinders are reciprocable the respective pistons 1 and 2. To one of these pistons, as for instance the piston 1, which may be designated for convenience the feed piston, is connected a tool holder or coupling, designated by the numeral 3, and the connection to this external coupling or support is by means of a piston rod 11, extending from the piston 1 through the end of the cylinder 10. The member 3 may be taken as illustrative of any suitable device whereby a tool may be supported and a force may be exerted in a direction axially of the cylinder 10.

The piston 2 in this instance is a floating piston, merely reciprocating freely within the cylinder 20, although, as will become apparent hereafter, the piston rod 11 might be connected to the piston 2, whereupon this piston would become the feed piston. Indeed, except for the desirability of reverse operation, the piston 2 might be omitted entirely, the cylinder 20 becoming merely a reservoir. For convenience the cylinder 20 may be designated a reservoir cylinder, and the piston 2 a reservoir piston, to distinguish them from the feed cylinder 10 and the feed piston 1.

Each of the two cylinders is thus divided by the piston within it into two chambers of mutually variable size. The chamber H1 in the cylinder 10 may be termed an hydraulic chamber, and the chamber P1 a pneumatic chamber, and similarly in the cylinder 2 the chamber H2 is an hydraulic chamber and the chamber P2 is a pneumatic chamber. The two hydraulic chambers H1 and H2 are interconnected by a conduit 40, in which conduit is disposed a metering valve 4 operable to close off intercommunication between the chambers H1 and H2, or to permit flow of a liquid L, which fills the two hydraulic chambers and the conduit, at a controlled maximum rate, from one such chamber to the other. A by-pass conduit 41, having a valve 42 therein, is also provided to by-pass the metering valve 4, but for the present it may be assumed that the valve 42 is in a position to close off the by-pass and to permit no intercommunication through the latter.

Compressed air is supplied from a conduit 50 past a pressure reducing valve 51, to reduce the usually comparatively high pressures to a pressure usable within the diamond drill, and this reduced pressure, through a conduit 52, is communicated to a valve 5. Branches 53 and 54 connect the valve to each of the pneumatic chambers P1 and P2, and a vent 55 is provided whereby these chambers may be alternatively vented. Any suitable vents or valve means may be employed for these purposes.

In the position of parts shown in Figure 4, assuming that the element 3 represents a connection to the drill rod to advance the latter, air under pressure is supplied at 50 and passes through the valve 5 and conduit 53 to the pneumatic chamber P1, acting upon the piston 1 and tending to move it to the right. This tendency, however, is resisted by the liquid L within the hydraulic chamber H1. The by-pass valve 42 is closed, so that the liquid cannot escape from the chamber H1 through the by-pass, and the metering valve 4 is set to permit the liquid to pass it at a controlled rate, but at no greater rate. The pneumatic chamber P2 being vented, the liquid flows from the chamber H1 into the chamber H2 at the rate for which the valve 4 is set, the piston 2 moving to the left, displacing air from the chamber P2, and the piston 1, moving to the right, displacing the liquid from the chamber H1. This movement at a controlled maximum rate proceeds until the pistons have reached the remote ends of their respective cylinders, thus advancing the drill rod which is connected to the member 3.

It will be observed that regardless of the amount of pneumatic pressure within the chamber P1, no movement of the member 3 is permitted unless the metering valve 4 is open, and when the latter is open the movement of the member 3 proceeds only at the rate permitted by the bleeding of the liquid past the valve 4 from the chamber H1 into the chamber H2. However, if the drill bit encounters extraordinary resistance, its advance at the maximum rate is not mandatory, because it is not fed by a positive feed means, but only by the yieldable pneumatic pressure in the chamber P1. The drill can therefore slow down its rate of advance to accommodate any unusual hardness which it may encounter, and, if desired, the rate of feed can be slowed down by decreasing the opening at the metering valve 4. Such an adjustment, either to increase or decrease the rate of feed, may be accomplished while the drill is operating and without any interruption, either in its rotation or in its feed. Should the drill bit break through into a fissure, the tendency of the pneumatic pressure medium at P1, which is expansible, is to advance the drill bit suddenly until it encounters the opposite face of the fissure. This cannot be permitted as it would undoubtedly fracture the diamond point, but because the liquid, which is inexpansible, at all times resists advance under the influence of pneumatic pressure at a rate beyond that for which the valve 4 is set, it is impossible for the drill bit thus to advance suddenly.

When it is desired to pull the drill rod, to withdraw it from the hole, it is only necessary to reverse the position of the valve 5 into the dotted line position shown in Figure 4. This vents the chamber P1, and supplies pneumatic pressure to the chamber P2. The piston 2, which under such conditions would ordinarily be at the left end of its cylinder, tends to move under the influence of the pneumatic pressure to the right, and this effects movement of the liquid from the chamber H2 back into the chamber H1, and in consequence the piston 1, which under such conditions is toward the right end of its cylinder, is acted upon by the liquid, tending to force it to the left. Since ordinarily such retraction can be safely accomplished at a higher speed than the rate of feed of the drill, and since it may not be desired to vary the setting of the metering valve 4 by opening it to the full, to permit free intercommunication between the chambers H1 and H2, the by-pass 41 and by-pass valve 42 are brought into use during such retraction. By moving the by-pass valve 42 into the dotted line position it affords free intercommunication between the chambers H1 and H2, and the liquid passing from the chamber H2 to the chamber H1 takes the path of least resistance through this by-pass 41. The same operation, it will be understood, is employed when, instead of pulling the drill rod, it is desired only to retract the tool chuck, represented by the member 3, to get a new grip upon the drill rod, higher up on the latter. The position of parts to accomplish the retraction of the drill rod is shown in Figure 1.

The construction shown in Figures 1, 2 and 3 is a preferred construction, and has a number of advantages over the diagrammatic arrangement shown in Figure 4. The drill rod is shown at 90 with the drill bit 9 at the end thereof. The drill rod is ordinarily tubular. All parts of the diamond drill, so far as possible, are disposed coaxially surrounding the drill rod. Thus the cylinder 10 surrounds the drill rod, and the piston rod 11 is tubular and surrounds the drill rod, and hence the piston 1 is annular in shape. The tubular piston rod 11 closes the inner side of the cylinder, and extends beyond the head 12 of the cylinder to a connection with a support 30 which corresponds closely to the element 3, previously referred to. The cylinder 20 likewise surrounds the drill rod, and preferably surrounds also the cylinder 10, although it is immaterial which of these two cylinders is outermost. Its piston 2 is likewise annular. The cylinders 10 and 20 are secured to heads in common, the head 12 having been previously mentioned and the head 22 being applied to the opposite end of the cylinders. The entire assembly is suitably supported, as for instance by a clamp 6, provided with clamping bolts 60, and provided also with a conical boss 61 by which it may be supported for angular adjustment from a suitably fashioned support which may be secured upon a stand, upon a mine bar or column, or upon any suitable fixed support.

When it is not desired to permit the member 30 to rotate, telescoping tubes 7 and 70 are provided, interconnected by a key 71 carried by one such tube and received in a keyway disposed in an axial direction along the other. One of these tubes, 7 for example, is secured to the member 30, and the other tube 70 is secured to the head 22. These two tubes immediately surround the drill rod 90, and as the feed progresses they telescope but prevent the member 30 from rotating. To facilitate rotation of the drill rod it is guided by a bushing 91 fitted about it adjacent the head 22 and engaged with bearings 92, whereby it may rotate freely with respect to the non-rotative head 22, and the parts associated with the latter.

While no particular reference has been made to packing arrangements, suitable packing is illustrated in connection with the pistons and piston rods, and would be provided as may be necessary. Similarly the conduit 40, the by-pass 41, and the associated valves, and the air conduits, as previously described, are connected in the proper manner to the various chambers. The entire arrangement is self-lubricating, the oil L having direct access to all moving parts of the drill proper.

The member 30, in the arrangement shown, forms a non-rotative support for a motor which rotates the drill rod. The form and details of this motor are no part of the present invention, and it is sufficient to state that it comprises a stator in the form of a housing 80 and a rotor 8 within the same, which rotor rotates in a given direction, under the influence of an expansible fluid supplied at the port 81. The rotor is preferably hollow, so that the drill rod 90, in any desired size, may pass freely therethrough. Secured to the rotor is a sleeve 82 which projects axially from the stator casing 80, and upon this sleeve 82 is secured the drill chuck 31. The stator 80 being secured to the nonrotative member 30 by the bolts 83, and the drill chuck 31 being secured to the rotor 8, the drill chuck will be rotated as the rotor 8 is rotated, and will be advanced or moved axially in either direction as the member 30 is moved axially under the influence of the movement of the pistons 1 and 2, primarily the feed piston 1 for forward advance, and of the reservoir piston 2 for retraction.

When it is desired to pull or retract the drill rod 90 a puller is provided which is always in a position convenient for engagement with the drill rod. Such a puller may comprise a cam 84 cooperating with a stirrup 85 to clamp the drill rod 90, the cam being pivoted upon the stirrup, and the whole being supported upon a post 86, which projects forwardly from the stator 80, or which is otherwise supported from the non-rotative member 30, which is the equivalent of a tool support. At such time as the puller is not required it may be swung aside, but it is always available for use when required, without the necessity of disturbing any other part of the diamond drill. The retraction is accomplished, as previously pointed out, by supplying air under pressure behind the piston 2, tending to move it to the right and therefore to force the piston 1 to the left, and this piston 1, through connections which are obvious, is connected to the stirrup 85, and the latter moves correspondingly to the piston 1.

I have described the preferred form of my invention in detail, not in a restrictive sense, but in order to make clear the arrangement and operation thereof, and as will be obvious to a man skilled in this art, various changes may be made in the form, character, and arrangement of the various parts, and the principles of the invention thus disclosed may be adapted to various purposes.

The diamond drill thus constituted applies an elastic expansible yet yielding force, that is, the force of the compressed air, behind the piston 1 in the chamber P1, to advance the drill, yet the liquid passing the metering valve 4 at a controlled maximum rate prevents any sudden advance of the drill bit, and should the drill bit encounter any unusual resistance the advancing force, being yieldable, will yield to slow down the rate of advance. Adjustments of the rate of advance may be made at any time during the operation of the drill. All forces are applied equally around the axis of the drill rod, producing a resultant acting directly in the line of the axis of the drill rod. The motor for rotating the drill rod is carried upon the feed mechanism, and the torque is applied equally around the axis of the drill rod. The puller is always in position available for use, and the operation of pulling the rod is extremely simple, as is evident from Figure 1 which shows that operation. Figure 3, on a larger scale, illustrates the forward feed or advance position of the parts, the advance having been partially completed.

What I claim as my invention is:

1. In combination with a tool holder, two coaxial cylinders spaced apart radially, a piston movable in each cylinder and dividing each of the latter into two non-communicating chambers of mutually variable size, means to supply air under pressure to one chamber of either cylinder, and to vent the corresponding chamber of the other cylinder, a conduit connecting the other two chambers, one in each cylinder, a liquid filling the latter chambers and the conduit, a metering valve in the conduit adjustable to govern the rate of flow of liquid between the connected chambers, and hence the rate of movement of the piston subjected to air pressure, and a connection between one such piston and the tool holder, whereby the latter moves in correspondence with such piston, in response to the pneumatic force and as governed by the metering valve.

2. In combination with a tool holder, a feed cylinder and a reservoir cylinder, one surrounding the other, a piston movable in and dividing the feed cylinder into two chambers of mutually variable size, and connected to the tool holder to move the latter correspondingly, a piston movable in and dividing the reservoir cylinder into two chambers of mutually variable size, means to supply air under pressure into one chamber of the feed cylinder, to produce a pneumatic force tending to advance the piston and tool holder, and to vent a chamber of the reservoir cylinder, a conduit connecting the other two chambers, one in each cylinder, a liquid filling the latter two chambers and the conduit, and a metering valve adjustable to govern the rate of flow of liquid from the feed cylinder to the reservoir cylinder, and hence the maximum rate of feed of the tool holder.

3. In combination with a tool holder, a feed cylinder and a reservoir cylinder, one surrounding the other, a piston movable in and dividing the feed cylinder into two chambers of mutually variable size, and connected to the tool holder to move the latter correspondingly, a piston movable in and dividing the reservoir cylinder into two chambers of mutually variable size, means to supply air under pressure into one chamber of the feed cylinder, to produce a pneumatic force tending to advance the piston and tool holder, and to vent a chamber of the reservoir cylinder, a conduit connecting the other two chambers, one in each cylinder, a liquid filling the latter two chambers and the conduit, a metering valve adjustable to govern the rate of flow of liquid from the feed cylinder to the reservoir cylinder, and hence the maximum rate of feed of the tool holder, and means to supply air under pressure to the previously vented chamber, and to vent the previous air pressure chamber, to retract the tool holder.

4. A feed for a diamond drill or the like, comprising an axially hollow pneumatic cylinder surrounding and disposed coaxially of the drill rod, a piston movable axially within said cylinder, a tubular piston rod projecting from said piston and surrounding the drill rod, a drill chuck supported from and movable with the piston rod, and formed for securement to the drill rod, means to supply air under pressure to the cylinder to advance the drill rod, and means adjustable to govern the maximum rate of advance.

5. A feed for a diamond drill or the like, comprising an axially hollow pneumatic cylinder surrounding and disposed coaxially of the drill rod, a piston movable axially within said cylinder, a tubular piston rod projecting from said piston and surrounding the drill rod, a drill chuck supported from and movable with the piston rod, and formed for securement to the drill rod, means to supply air under pressure to the cylinder to advance the drill rod, means adjustable to govern the maximum rate of advance, and means interposed between the piston rod and the drill chuck to rotate the latter.

6. A feed for a diamond drill or the like, comprising a tubular piston rod disposed coaxially with and surrounding the drill rod, a drill chuck supported from and movable with the piston rod, and formed for securement to the drill rod, a feed cylinder coaxially surrounding the piston rod, a piston movable therein and secured to the piston rod, a reservoir cylinder likewise coaxially surrounding the drill rod, a conduit affording communication between the reservoir cylinder and one end of the feed cylinder, a liquid filling the feed cylinder, at one side of the piston, at all times, and said conduit and in part the reservoir cylinder, a metering valve adjustable to control the maximum rate of flow of the liquid from the feed cylinder into the reservoir cylinder, and therefore the maximum rate of feed of the feed piston, and means to supply a yieldable pressure to the feed cylinder, to advance the feed piston and drill chuck, in opposition to the resistance of the liquid.

7. A diamond drill or the like comprising a drill chuck formed for securement to the drill rod, a non-rotative support surrounding the drill rod, and movable in a direction axially of the latter, a rotary engine including a stator and a rotor, the stator being mounted upon and movable axially with said support, and the rotor being operatively connected to the drill chuck to rotate the latter, and means for advancing said support, axially of the drill rod.

8. A diamond drill or the like comprising a drill chuck formed for securement to the drill rod, a non-rotative support surrounding the drill rod, and movable in a direction axially of the latter, a rotary engine including a stator and a rotor, the stator being mounted upon and movable axially with said support, and the rotor being operatively connected to the drill chuck to rotate the latter, means having the characteristic of a rapid advance upon decreased resistance, for advancing said support, axially of the drill rod, and means adjustable to govern the maximum rate of advance.

9. A feed for a diamond drill or the like comprising two concentric annular cylinders, two heads common to the two cylinders, and axially apertured for the passage of the drill rod, a piston movable lengthwise of each cylinder, to divide each cylinder into a pneumatic chamber, adapted to be vented, and an hydraulic chamber, a conduit interconnecting the two hydraulic chambers, one in each cylinder, a liquid filling the two hydraulic chambers and the conduit, a metering valve in said conduit governing the rate of bleeding from one cylinder to the other, and thereby controlling the maximum rate of movement of the pistons, means to supply air under pressure to one pneumatic chamber, the other being vented, thereby tending to advance the piston in the pressure chamber into the associated hydraulic chamber, and through the liquid to effect corresponding movement of the other piston at a controlled rate, a tubular piston rod connected to one of said pistons, and a tool chuck supported from and movable with said piston rod.

10. A feed for a diamond drill or the like comprising a tubular piston rod coaxially surrounding the drill rod, a drill chuck rotatively mounted upon and axially movable with said piston rod, an annular feed cylinder coaxially surrounding the piston rod, a feed piston therein secured to the piston rod, and dividing the cylinder into a pneumatic chamber and an hydraulic chamber, means to prevent rotation of the piston rod, a second annular reservoir cylinder coaxially surrounding the feed cylinder, an annular piston in the reservoir cylinder dividing it likewise into a pneumatic chamber and an hydraulic chamber, a conduit connecting the two hydraulic chambers, a liquid filling both such hydraulic chambers and the conduit, a metering valve adjustable to govern the maximum rate of flow from one such chamber to the other, and means to vent the pneumatic chamber in the reservoir cylinder and to supply air under pressure to the pneumatic chamber in the feed cylinder, thereby to effect advance of the feed piston at a rate controlled by the pneumatic pressure, limited by the setting of the metering valve.

11. A feed for a diamond drill or the like, comprising a tubular piston rod coaxially surrounding the drill rod, a drill chuck rotatively mounted upon and axially movable with said piston rod, an annular feed cylinder coaxially surrounding the piston rod, a feed piston therein secured to the piston rod, and dividing the cylinder into a pneumatic chamber and an hydraulic chamber, means to prevent rotation of the piston rod, a second annular reservoir cylinder coaxially surrounding the feed cylinder, an annular piston in the reservoir cylinder dividing it likewise into a pneumatic chamber and an hydraulic chamber, a conduit connecting the two hydraulic chambers, a liquid filling both such hydraulic chambers and the conduit, a metering valve adjustable to govern the maximum rate of flow from one such chamber to the other, means to vent the pneumatic chamber in the reservoir cylinder and to supply air under pressure to the pneumatic chamber in the feed cylinder, thereby to effect advance of the feed piston at a rate controlled by the pneumatic pressure, limited by the setting of the metering valve, said latter means being alternatively operable to vent the pneumatic chamber in the feed cylinder and to supply air under pressure to the pneumatic chamber of the reservoir cylinder, thereby to effect retraction of the feed piston.

12. A feed for a diamond drill or the like, comprising a tubular piston rod coaxially surrounding the drill rod, a drill chuck rotatively mounted upon and axially movable with said piston rod, an annular feed cylinder coaxially surrounding the piston rod, a feed piston therein secured to the piston rod, and dividing the cylinder into a pneumatic chamber and an hydraulic chamber, means to prevent rotation of the piston rod, a second annular reservoir cylinder coaxially surrounding the feed cylinder, an annular piston in the reservoir cylinder dividing it likewise into a pneumatic chamber and an hydraulic chamber, a conduit connecting the two hydraulic chambers, a liquid filling both such hydraulic chambers and the conduit, a metering valve adjustable to govern the maximum rate of flow from one such chamber to the other, means to vent the pneumatic chamber in the reservoir cylinder and to supply air under pressure to the pneumatic chamber in the feed cylinder, thereby to effect advance of the feed piston at a rate controlled by the pneumatic pressure, limited by the setting of the metering valve, said latter means being alternatively operable to vent the pneumatic chamber in the feed cylinder and to supply air under pressure to the pneumatic chamber of the reservoir cylinder, thereby to effect retraction of the feed piston, a by-pass conduit connecting the two hydraulic chambers, and a valve therein operable to close off communication therebetween to permit advance under control of the metering valve, and to effect such communication to expedite retracting movement without disturbance of the metering valve.

13. The combination of claim 10, including relatively non-rotative telescoping tubes coaxially surrounding the drill rod, and secured one to a cylinder and one to the piston rod, to prevent rotation of the latter, and a motor including a stator mounted upon the piston rod, and a rotor connected to the drill chuck, to effect rotation of the latter.

14. A diamond drill or the like comprising a drill chuck formed for securement to the drill rod, a non-rotative support surrounding the drill rod, and movable in a direction axially of the latter, a rotary engine including a stator mounted upon and movable axially with said support, and a rotor operatively connected to the drill chuck to rotate the latter, means to advance and to retract the support, axially of the drill rod, and a rod puller engageable with the drill rod, and supported from said support, for movement axially with the latter.

15. A feed for a diamond drill or the like, comprising two spaced-apart coaxial cylindrical shells and two annular heads, defining an annular feed cylinder, the head at one end spanning and closing the space between the two shells, and the head at the opposite end extending inwardly from the outer of the two shells and having an axial bore, an annular piston fitting closely between said shells, a tubular piston rod secured to the piston, encircling the inner shell, and slidably projecting through and fitting closely within said cylinder head bore, a drill chuck supported from and movable with the projecting end of the piston rod, a third shell spaced outwardly of and surrounding the outer of the first two shells, and engaged with each head to define an annular reservoir cylinder, a conduit affording communication between the reservoir cylinder and one end of the feed cylinder, a liquid filling the feed cylinder, at one side of the piston, at all times, and said conduit and in part the reservoir cylinder, a metering valve adjustable to control the maximum rate of flow of the liquid from the feed cylinder into the reservoir cylinder, and therefore the maximum rate of feed of the piston, and means to supply a yieldable pressure within the feed cylinder, to advance the piston and drill chuck, in opposition to the resistance of the liquid.

16. A feed for a diamond drill or the like comprising two spaced-apart coaxial cylindrical shells and two annular heads defining an annular feed cylinder, the head at one end spanning and closing the space between the two shells, and the head at the opposite end extending inwardly from the outer of the two shells and having an axial bore, an annular piston fitting closely between said shells, a tubular piston rod secured to the piston, encircling the inner shell, and slidably projecting through and fitting closely within said cylinder head bore, means to prevent rotation of the piston rod relative to said shells, a drill chuck supported from and movable with the projecting end of the piston rod, means supported wholly by the piston rod, interposed between the latter and the chuck, for rotating the chuck, and means to supply a pressure medium within the cylinder, to advance the piston and the chuck and its rotating means.

17. A feed for a diamond drill or the like, comprising two spaced-apart coaxial cylindrical shells and two annular heads defining an annular feed cylinder, the head at one end spanning and closing the space between the two shells, and the head at the opposite end extending inwardly from the outer of the two shells and having an axial bore, an annular piston fitting closely between said shells, a tubular piston rod secured to the piston, encircling the inner shell, and slidably projecting through and fitting closely within said cylinder head bore, means to prevent rotation of the piston rod relative to said shells, a drill chuck supported from and movable with the projecting end of the piston rod, a third shell spaced outwardly of and surrounding the outer of the two first shells, and engaged with the heads to define an annular reservoir cylinder, a conduit affording communication between the reservoir cylinder and one end of the feed cylinder, a liquid filling the feed cylinder, at one side of the piston at all times, and said conduit and in part the reservoir cylinder, a metering valve adjustable to control the maximum rate of flow of the liquid from the feed cylinder into the reservoir cylinder, and therefore the maximum rate of feed of the piston, means to supply a pressure medium within the feed cylinder, to advance the piston and drill chuck, in opposition to the resistance of the liquid, and means supported wholly by the piston rod, interposed between the latter and the chuck, for rotating the chuck.

18. In combination with a tool holder, three coaxial cylindrical shells spaced apart radially, to define a feed cylinder between the inner and the intermediate shells and a reservoir cylinder between the intermediate and outer shells, an annular feed piston movable lengthwise of the feed cylinder, a piston rod connected to the piston and projecting from the feed cylinder, tool-engaging means carried upon the projecting portion of the piston rod, means to supply a pressure medium within the feed cylinder, to advance the piston rod and tool-engaging means, a conduit connecting the feed cylinder with the reservoir cylinder, and means in said conduit to control the rate of flow of a fluid from the feed cylinder to the reservoir cylinder under the influence of the pressure medium.

19. In combination with a tool holder, a feed cylinder closed at one end, tube means extending from its end which is adjacent the tool holder axially through the cylinder and to its opposite end, and being fixed to and thereby closing such opposite end, a ventable reservoir, an annular piston movable in and dividing the feed cylinder into two chambers of mutually variable size, means surrounding said tube means and connecting the piston to the tool holder to move the latter correspondingly, the tool holder being axially hollow, whereby a tool rod may pass entirely through the connecting means, the tube means, and the same and through the piston and cylinder, a liquid contained within the reservoir and sufficient in volume to fill the greatest volume of one of the feed cylinder's chambers, a conduit connecting the reservoir and such chamber of the feed cylinder, means to supply air under pressure to the other chamber of the feed cylinder, to produce a pneumatic force tending to advance the piston and tool holder, and a metering valve adjustable to govern the rate of flow of liquid from the feed cylinder to the reservoir, and hence the maximum rate of feed of the tool holder.

HENRY S. HOFFAR.